SEMICONDUCTOR PHOTOELECTRIC DEVICE

Filed March 21, 1951

INVENTOR
J. N. SHIVE
BY [signature]
ATTORNEY

Patented June 9, 1953 2,641,713

UNITED STATES PATENT OFFICE 2,641,713

SEMICONDUCTOR PHOTOELECTRIC DEVICE

John N. Shive, Plainfield, N. J., assignor to Bell Telephone Laboratories, Incorporated, New York, N. Y., a corporation of New York Application March 21, 1951, Serial No. 216,754

6 Claims. (Cl. 250—211)

This invention relates to photosensitive semiconductor devices and more particularly to such devices including bodies of semiconductive material having contiguous zones of opposite conductivity types therein.

It is known in the art that junctions between zones of opposite conductivity types in bodies of semiconductive material, such as silicon and germanium, are photosensitive. That is, in known devices a beam of light is directed against one face of the body, to which face the junction extends, and the current obtained between terminals at opposite ends of the body is dependent upon the position of the beam relative to the junction. This current results from the liberation of charges within the body by the absorption of light, and these charges are the primary source of the photocurrent.

The sensitivity of such known devices is limited and, further, reproducibility of characteristics from device to device is difficult.

One general object of this invention is to attain improved performance characteristics for semiconductor photoresponsive devices. More specific objects of this invention are to increase the sensitivity of such devices, to realize reproducible characteristics therefor, and to extend control of the performance parameters.

In one illustrative embodiment of this invention, a photocell comprises a body of germanium having therein a pair of N conductivity-type zones on opposite sides of and contiguous with a zone of P conductivity-type. A source is connected between the two N zones whereby one of the PN junctions is biased in the reverse direction and the other junction is biased in the forward direction. Light is directed against the P type zone, against one or both of the N type zones in proximity to the P zone or against both the P zone and one or both of the N zones at regions in proximity to the P zone. The absorption of light by the body alters the energy levels within the body whereby flow of charge carriers between the terminals is enhanced. Thus, the light alters the effective impedance of the body and provides a control action upon the current flow between the terminals.

The invention and the various features thereof will be understood more clearly and fully from the following detailed description with reference to the accompanying drawing in which.

Figures 1, 2, 3, 4:
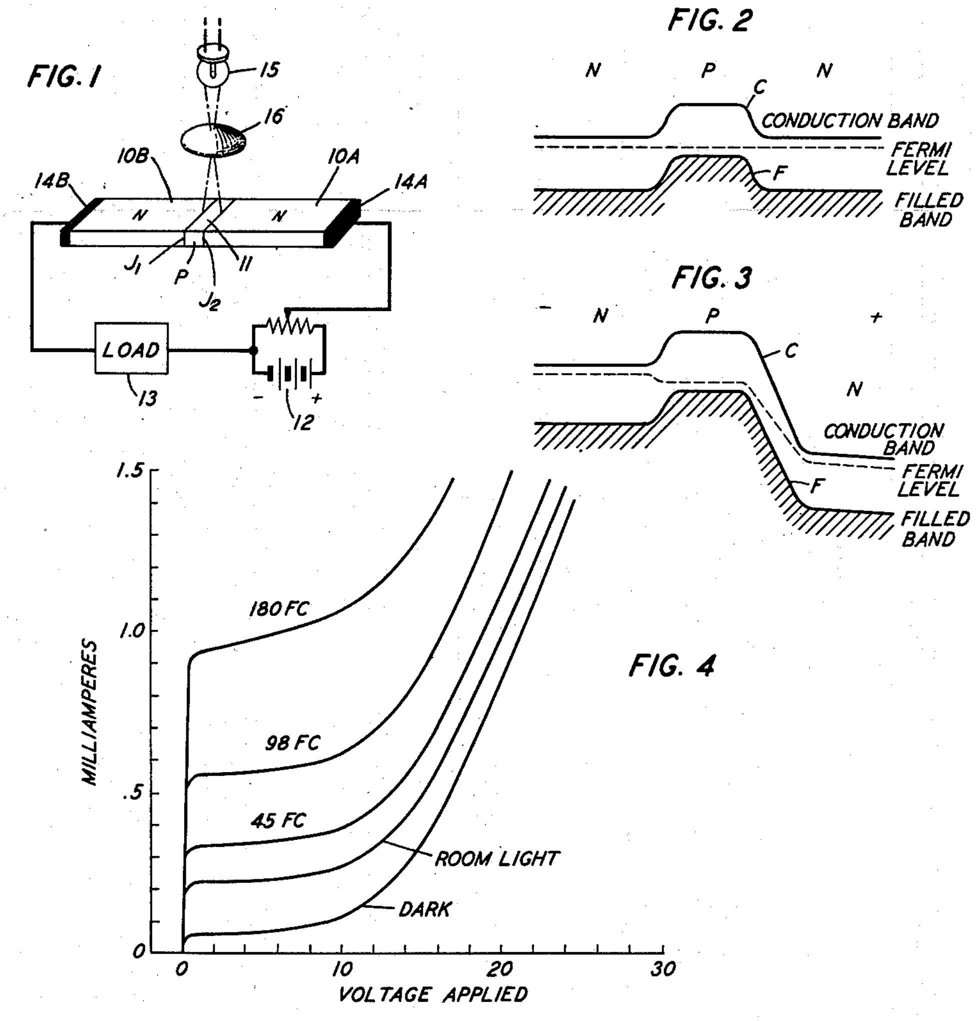
Fig. 1 is in part a perspective view and in part a circuit diagram depicting one illustrative embodiment of this invention.
Figs. 2 and 3 are energy diagrams which will be referred to hereinafter in analyzing the mechanism of the operation of the device illustrated in Fig. 1.
Figs. 4 and 5 are graphs portraying typical performance characteristics of photosensitive semiconductor devices constructed in accordance with this invention.

Referring now to the drawing, the photosensitive device shown in Fig. 1 comprises a body of germanium having two zones 10A and 10B of N conductivity-type on opposite sides of and contiguous with a thin zone 11 of P conductivity-type, the three zones forming two barriers or junctions $J_1$ and $J_2$. Advantageously, the body is of single crystal structure. It may be produced in one way in accordance with the method described in the application Serial No. 168,184, filed June 15, 1950 of G. K. Teal. In a typical embodiment, the body may be .125 inch long, .020 inch thick and .040 inch wide, with the P type zone 11, .020 inch thick. The thickness of the zone 11 is of prime moment as will be pointed out hereinafter.

A direct-current biasing source, such as a battery 12, in series with a load 13 is connected between ohmic connections or terminals 14A and 14B, such as copper platings, on the two N type zones. One surface of the body, or a portion thereof, is illuminated from a light source 15, through a concentrating lens 16. The faces of the body particularly advantageously are treated to decrease the recombination rate of electrical carriers thereat. An especially satisfactory treatment, disclosed in detail in the application Serial No. 175, 648, filed July 24, 1950 of J. R. Haynes and R. D. Heidenreich, comprises chemically polishing the surfaces to a mirror finish in the manner described in the application Serial No. 164,303, filed May 25, 1950 of R. D. Heidenreich, now Patent 2,619,414, granted November 25, 1952, and then subjecting the surfaces to a cataphoretic treatment, with the germanium body electrically positive relative to a metallic electrode, in an antimony oxychloride sol.

In brief, in the operation of the device, light is absorbed by the germanium body, resulting in a decrease in the impedance between the terminals 14 and a corresponding increase in the current supplied to the load 13. The current is a function of the bias voltage impressed between the terminals and of the illumination intensity as will be noted hereinafter. However, it may be remarked here that the sensitivity is extremely high, current increases of the order of 100 electrons for each incident photon having been attained in typical devices.

The mechanism of control involved and features of the invention may be understood from a consideration of the energy level diagrams, Figs. 2 and 3, for the device shown in Fig. 1. In Figs. 2 and 3, the Fermi level is indicated, curves C represent the bottom of the conduction band, curves F represent the top of the filled band, and the regions marked N and P correspond to the similarly identified zones or regions in Fig. 1. In Fig. 2, the energy levels are portrayed for the germanium body of Fig. 1 without a bias applied thereto and in Fig. 3 the levels are depicted for the case with the bias from source 12 applied, the positive pole of the source being connected to the right-hand N type zone in both Figs. 1 and 3.

As is evident from Fig. 2, the semiconductive body in the device of Fig. 1 includes two PN junctions in series opposing relation whereby a high impedance to current flow in either direction between the two N type zones obtains. For the condition depicted in Fig. 3, it will be noted that one junction, $J_2$ in Fig. 1, is biased in the reverse direction and the other junction, $J_1$ in Fig. 1, is biased in the forward direction. The potential across the semiconductive body is composed of the internal IR drops in the N and P zones and the drops across the two junctions; of these components, the drop across the junction $J_2$ is large and the others are small.

The current flowing across a PN junction, such as $J_2$ in Fig. 1, biased in the reverse direction is the sum of the hole current from the N zone to the P zone and the electron current from the P zone to the N zone. As is known, the carriers normally in excess in P type semiconductors are holes and the carriers normally in excess in N type semiconductors are electrons. Thus, it will be appreciated that the magnitude of the current flow across a junction such as is here under consideration is determined by the concentrations of the minority carriers on each side of the junction, namely holes in the N zone and electrons in the P zone.

As noted above, the other junction, $J_1$ in Fig. 1, is biased in the forward direction. Because of the bias, the barrier to flow of carriers across the junction in each direction, that is holes from the P type zone and electrons from the N type zone, is decreased. The flow of electrons into the P type zone increases the concentration of the minority carriers, electrons, in this region with a consequent increase in the current across the reversely biased junction $J_2$. Stated in another way, the reverse current across the junction $J_2$ is modulated by the current across the forwardly biased junction $J_1$.

When light is absorbed in germanium, one electron and one hole are created for each photon absorbed. The electron is elevated to the upper or conduction band and the hole is left in the lower or filled band. When this occurs in the P zone, some of the electrons thus liberated recombine with an equal number of holes but others diffuse into the N type regions on either side of the P zone leaving the residual holes trapped in the P zone. The space charge of these trapped holes lowers the local potential in the zone, whereby the energy levels in this zone are depressed. Consequently the barrier to flow of electrons from the N zone across the junction $J_1$ is reduced. The number of electrons which then flow from this N zone into the P zone exceeds the number which diffuse from the P zone into the N zone and as a result the concentration of the minority carriers, electrons, in this P zone is increased and the current flow across the reversely biased junction $J_2$ is increased. Thus, the current flow between the two N zones, and between the terminals 14 of the device shown in Fig. 1 is increased. Viewed in one way, the conductance of the semiconductive body, between the terminals 14 is increased by the absorption of light by the P zone.

When light falls upon either of the N type zones or regions the same possibilities, above discussed, of recombination and separation by diffusion of the holes and electrons exist. Specifically, holes diffuse across the junctions and the electrons are left behind. The effect of this action is the same as that described above for the diffusion of electrons from the P zone into the N zones, the ultimate result being an effective increase in the conductance of the semiconductive body and an increase in the current flow between the terminals 14 in Fig. 1, of the semiconductive body.

It is to be remarked particularly that the action above described is not photovoltaic. Also the charges liberated by the absorption of light are not the primary source of the increased current. The light provides a control upon the current flow through the modulation of the current across the reversely biased junction by passage of carriers across the forwardly biased junction and alteration of the concentrations of the minority charge carriers in the zones.

Two factors of major import in the operation of the device as above described are to be noted especially, these being the lifetimes of the liberated carriers and the diffusion length for the holes. As is indicated hereinabove, the increase in conductance is attributable to those carriers which are liberated by the absorption of light and do not recombine with carriers of the opposite sign, but diffuse into the adjacent zone or zones. Also, it is noted that the modulation of the current across the reversely biased junction $J_2$ increases as the carrier lifetimes increase. Thus, minimum recombination rates are desirable. In germanium, recombination occurs both in the bulk of the material and at the surfaces of the body, the surface recombination usually being greater than the bulk. The recombination rate in the bulk of the material of the device such as illustrated in Fig. 1 is reduced by utilizing a single crystal body. The surface recombination rate is substantially reduced by the surface treatment of the semiconductor body described hereinabove.

Further, as is clear from the analysis hereinabove, the action described depends upon the diffusion of the liberated carriers from one zone into another. Hence, the P zone or region should be no greater in thickness, measured between the two N zones, than the diffusion length of these carriers. Thus, in devices of the construction shown in Fig. 1 and described hereinabove, the thickness of the P zone 11 may be of the order of a few tenths millimeter.

The diffusion length also determines the extent of the area of illumination for which maximum sensitivity of the device is obtainable. Specifically, this area extends over the P zone and to the N zones beyond the junctions a distance substantially equal to the diffusion length for holes.

As has been noted heretofore, the dark leakage current due to the biasing source 12 is dependent in magnitude upon the concentration of the minority carriers in the several zones of the body. Desirably, this current should be small. Hence advantageously, the zones 10A and 10B are made as strongly N type and the zone 11 is made as strongly P type as possible, consistently with the need for keeping the densities of the donor and acceptor impurities, which may act as recombination centers and lead to shorter carrier lifetimes, reasonably small. The N type zone which in practice receives the negative bias (shown in the figures as the left-hand zone) may advantageously have a low resistivity, corresponding to a large density of electrons available for conduction into the P type layer when the barrier is lowered by light. In NPN germanium bodies fabricated in accordance with the method disclosed in the Teal application identified hereinabove, and included in devices of the construction shown in Fig. 1, N zones have resistivities of the order of 10 and .01 ohm centimeters and a P zone having a resistivity of 1 ohm centimeter have been found satisfactory.

Figure 5:
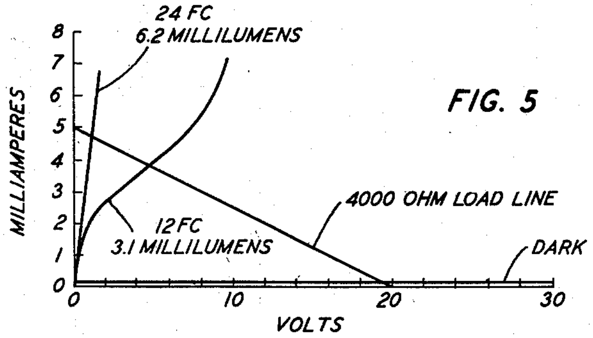

Performance characteristics of typical photosensitive devices such as shown in Fig. 1 and constructed in accordance with this invention are illustrated in Figs. 4 and 5. In both these figures, current in milliamperes between the terminals 14 is plotted against biasing voltage applied between these terminals, for several values of illumination intensity, the latter parameter being indicated in foot candles on the individual curves. Also indicated in Fig. 5 is the 4000 ohm load line.

The three upper curves in Fig. 4 represent the current-voltage relationship for illumination of the entire surface, the upper surface in Fig. 1, of the semiconductor body by a source 15 of the intensities designated. The curves of Fig. 5 portray this relationship for the case where the light is focussed upon the P zone and the immediately adjacent regions of the N zones by a lens 16, the flux intensities being those on the face of the lens 16, which had an area of .04 square inch. The light source used for these measurements was a tungsten filament lamp operated at a color temperature of 2400 degrees absolute.

It will be noted from Figs. 4 and 5 that the response is a function of both the illumination and the biasing voltage. In Fig. 5 it is seen that a light flux of 6.2 millilumens is sufficient to effectively wipe out the NPN barrier, in which case the current between the electrodes 14 is limited by the ohmic resistance of the germanium in the cell, in this case about 220 ohms. Particularly to be noted is the high sensitivity. In typical devices, current increases of 100 electrons per one incident photon per second have been obtained.

Although the invention has been described with particular reference to germanium devices and such devices wherein a P zone is sandwiched between a pair of N zones, it may be embodied also in silicon devices and in photoelectric cells of either silicon or germanium wherein an N zone is sandwiched between two P zones. Also, it will be understood that various modifications may be made in the specific embodiment shown and described without departing from the scope and spirit of this invention.

What is claimed is:

1. A photosensitive device comprising a body of semiconductive material having therein and extending inwardly from one face thereof a pair of zones of one conductivity-type separated by and contiguous with a zone of the opposite conductivity-type, the thickness of the intermediate zone being no greater than the diffusion length of charge carriers normally in minority in said intermediate zone, means for impressing a biasing potential between said pair of zones, and means for directing light against said one face.

2. A photosensitive device in accordance with claim 1 comprising means for concentrating the light upon said intermediate zone.

3. A photosensitive device in accordance with claim 1 wherein said material is germanium.

4. A photosensitive device in accordance with claim 1 wherein said material is silicon.

5. A photosensitive device comprising a body of germanium having therein and extending inwardly from one face thereof a pair of N conductivity-type zones separated by and contiguous with a zone of P conductivity-type, the thickness of said P-type zone being no greater than a few tenths millimeter, terminal connections to said N-type zones, a direct-current biasing source connected between said connections, and means illuminating said face at said P zone.

6. A photosensitive device comprising a single crystal body of germanium having a mirror finish face, said body having extending inwardly from said face a pair of N conductivity-type zones contiguous with and separated by a P conductivity-type zone, said P-type zone being no greater than a few tenths millimeter in thickness, means for applying a biasing potential between said N-type zones, and means for directing a concentrated light beam upon said face at said P type zone.

JOHN N. SHIVE.

References Cited in the file of this patent

UNITED STATES PATENTS

| Number | Name | Date |
|---|---|---|
| 2,402,662 | Ohl | June 25, 1946 |
| 2,482,980 | Kallmann | Sept. 27, 1949 |